United States Patent [19]

Lentz

[11] Patent Number: 5,501,069

[45] Date of Patent: Mar. 26, 1996

[54] SELF-CLEANING RAKE

[76] Inventor: Bernard E. Lentz, 23 Wyandotte Dr., Cherokee Village, Ark. 72529

[21] Appl. No.: 343,367

[22] Filed: Nov. 22, 1994

[51] Int. Cl.$^6$ ..................................................... A01D 7/10
[52] U.S. Cl. ................................... 56/400.100; 56/400.18
[58] Field of Search ............................ 56/400.1, 400.08, 56/400.18, 400.2, 400.21

[56] References Cited

U.S. PATENT DOCUMENTS

| | | | |
|---|---|---|---|
| 2,713,763 | 7/1955 | Holman et al. | 56/400.1 |
| 3,701,243 | 10/1972 | Durkee | 56/400.18 |
| 3,750,379 | 8/1973 | Huspen | 56/400.18 |
| 3,884,023 | 5/1975 | Robinson | 56/400.1 |
| 3,901,010 | 8/1975 | Pajunen | 56/400.08 |
| 4,059,945 | 11/1977 | Martinez | 56/400.1 |
| 4,086,750 | 5/1978 | White | 56/400.18 |
| 4,165,598 | 8/1979 | Kutsi | 56/400.1 |
| 4,776,158 | 10/1988 | Baum | 56/400.08 |
| 4,850,185 | 7/1989 | Dimon | 56/400.1 |

FOREIGN PATENT DOCUMENTS 0113906  10/1941  Australia ........................... 56/400.18

*Primary Examiner*—Terry Lee Melius
*Attorney, Agent, or Firm*—Stephen D. Carver; Trent C. Keisling

[57] ABSTRACT

A self-cleaning rake. In a preferred embodiment, a rake assembly couples to a conventional broom, mop, or other conventional yard implement handle. The rake handle attaches to a receiver in the header of the rake assembly. An operator uses a sliding, hand operated actuator that is coupled to a spreader by a link. In the preferred embodiment, the actuator exteriorly captivates a portion of the rake handle. In an alternative embodiment, my self-cleaning rake uses an interior actuator that is housed inside the rake handle. The rake handle also houses a substantial portion of the link. A hand grip protrudes from the side of the rake handle to facilitate operator manipulation of the actuator. The operator moves the actuator longitudinally along the rake handle. The longitudinal movement of the actuator forces the spreader to slide longitudinally along the rake tines to remove debris from the tines. The tines pivot inside a flange to move radially as the spreader moves longitudinally. The flange extends from the header, defining a casing that captivates a terminal end of the tines. A guide in the header supports the link while restricting its longitudinal range of movement. The guide also temporarily frictionally locks the spreader into a stored or retracted position that permits the rake to be conventionally used. The spaced apart raking ends of the tines assist the movement of the link into a locking engagement.

14 Claims, 6 Drawing Sheets

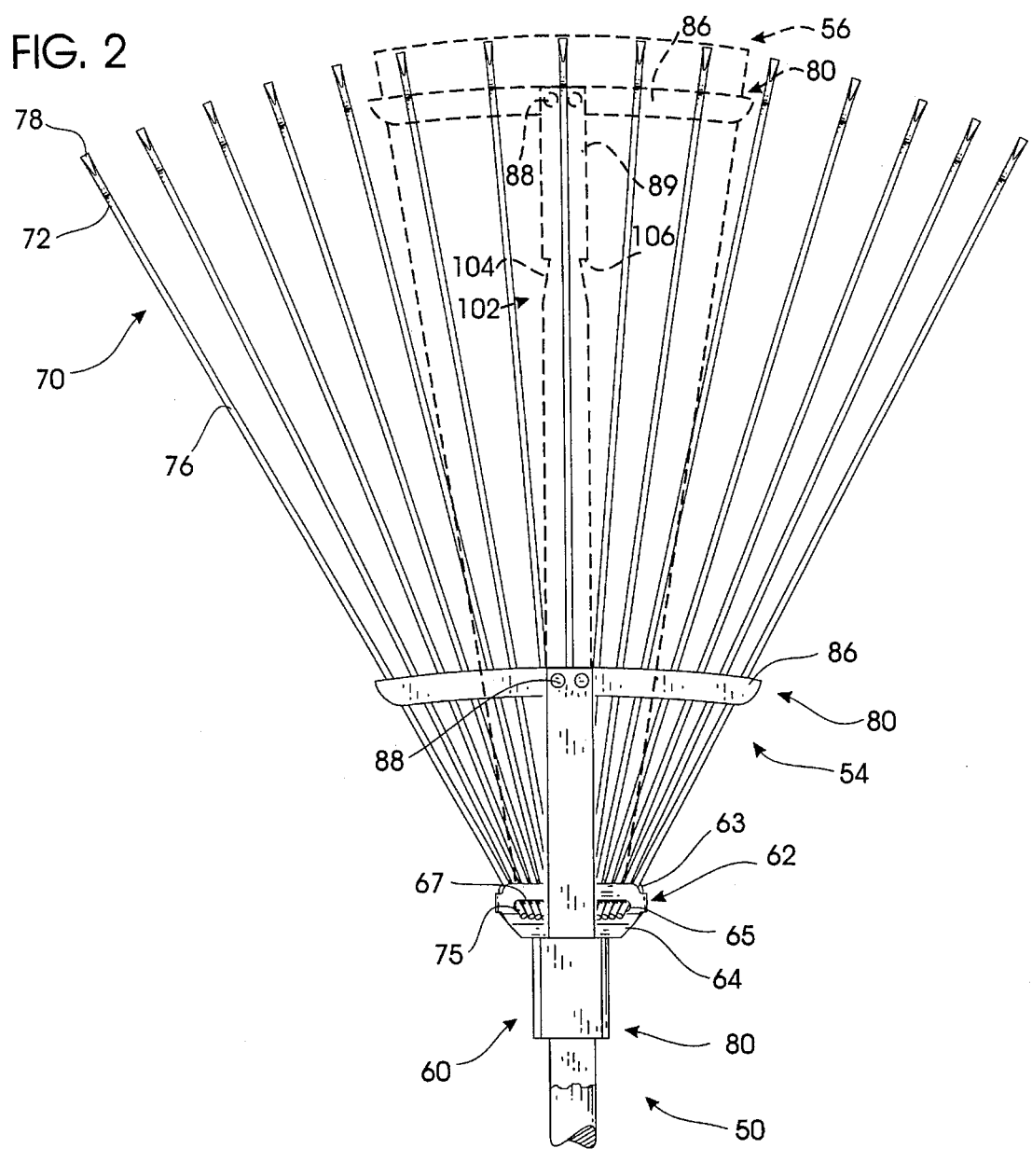
FIG. 2
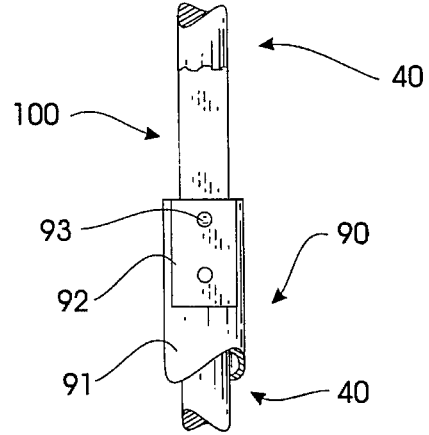

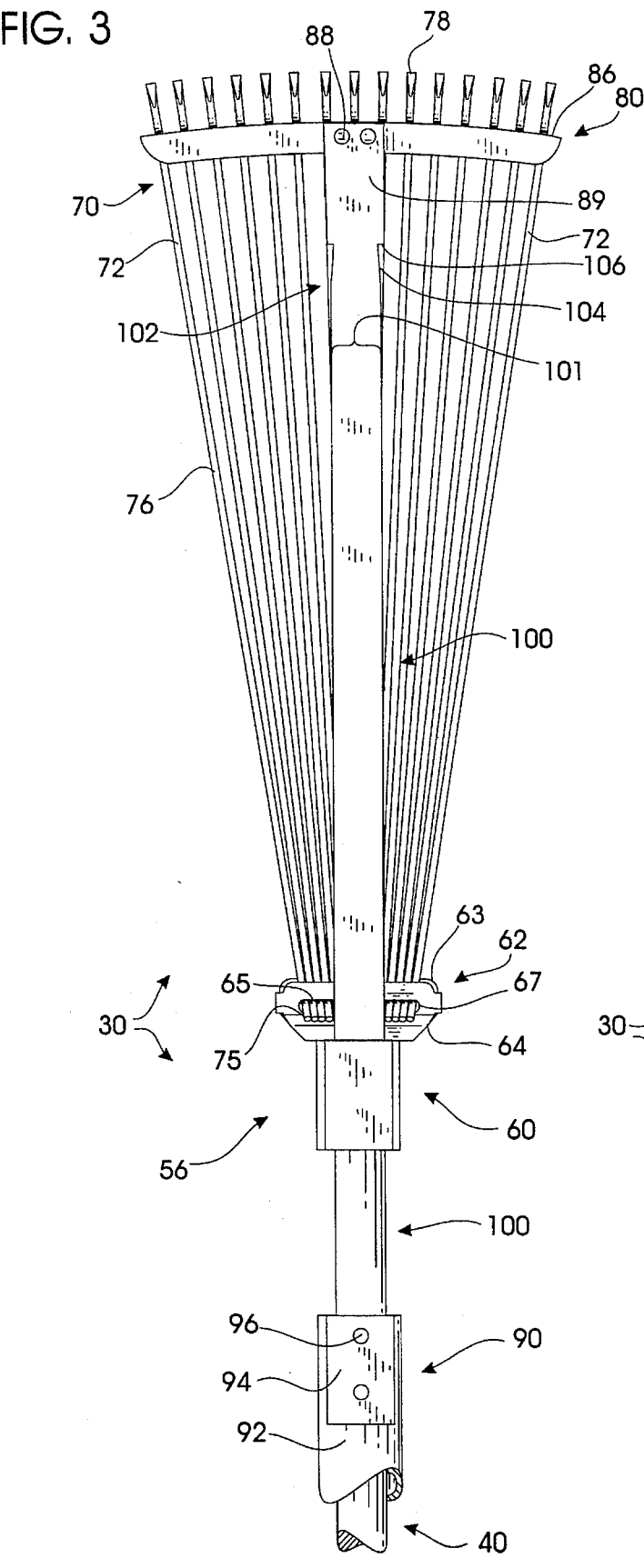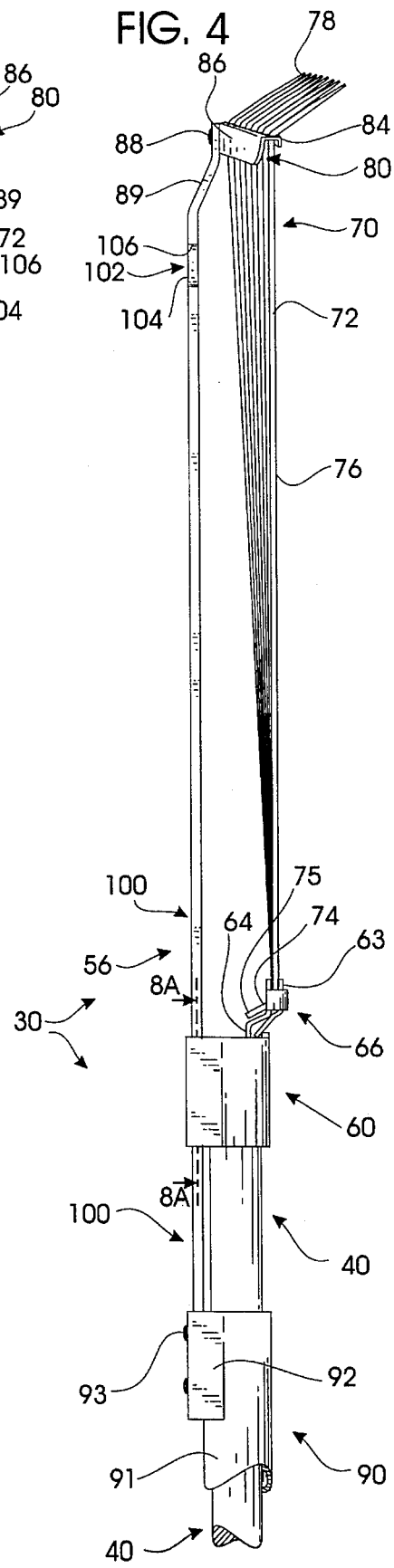

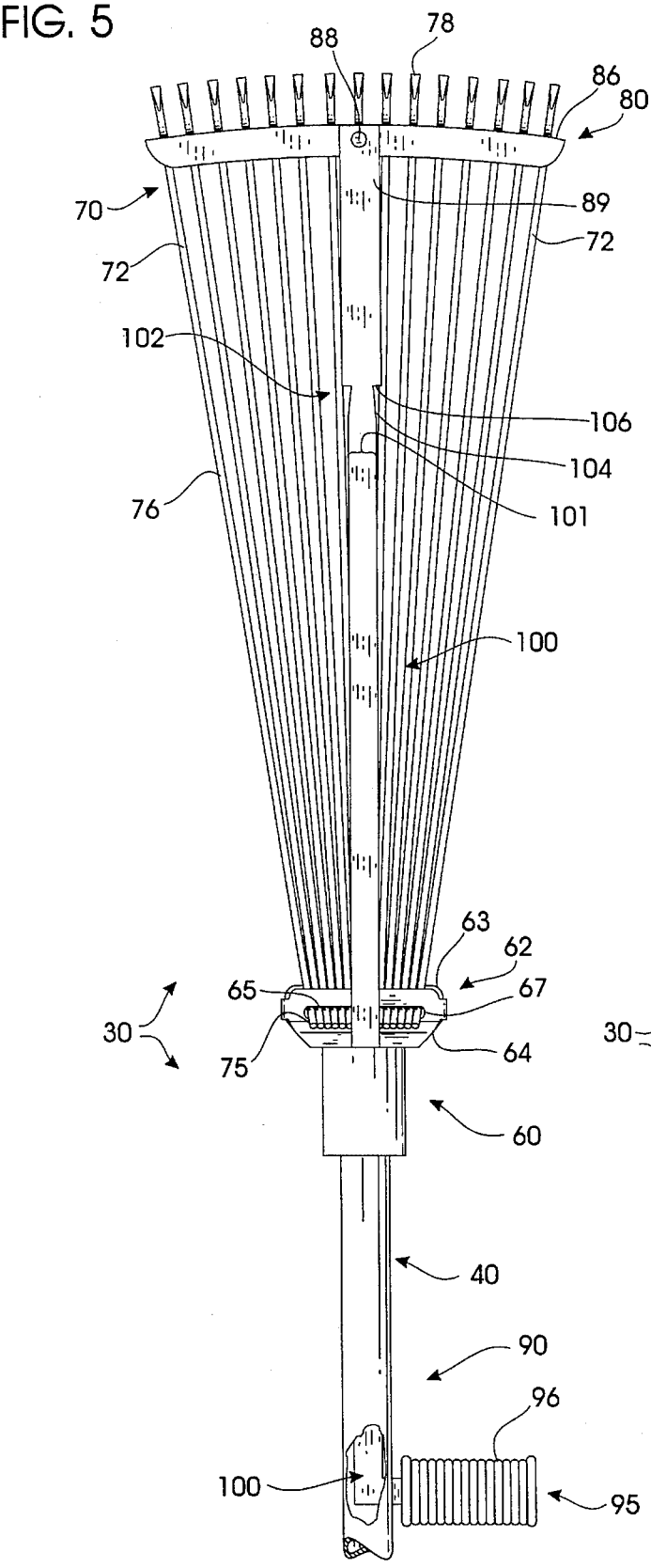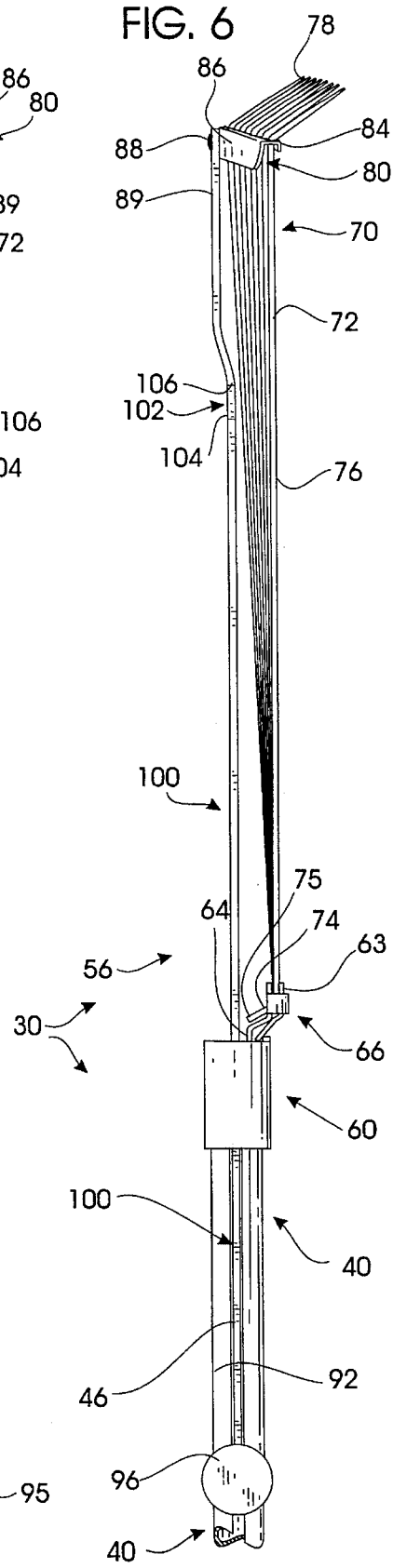

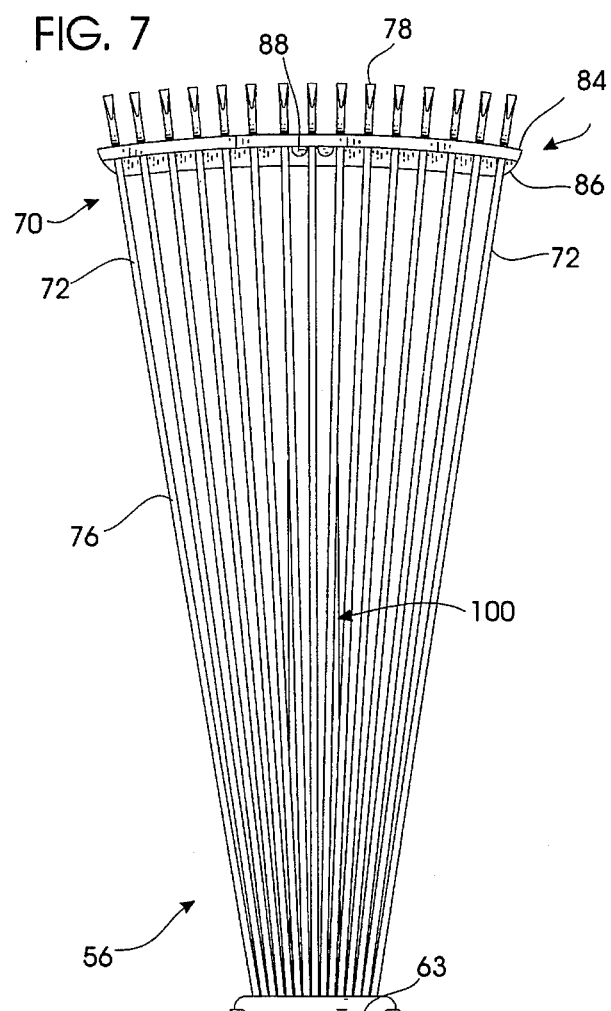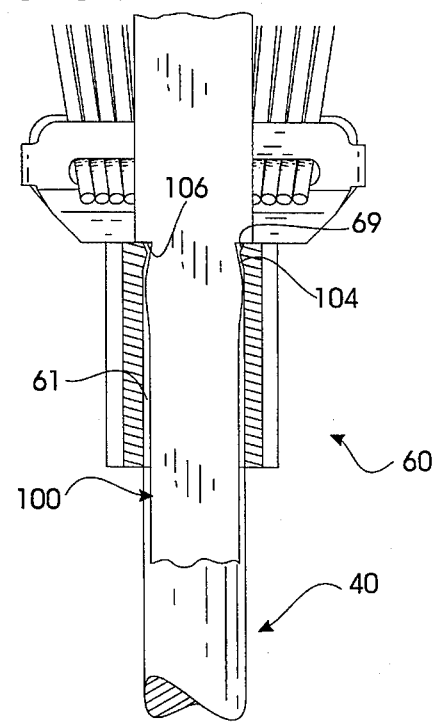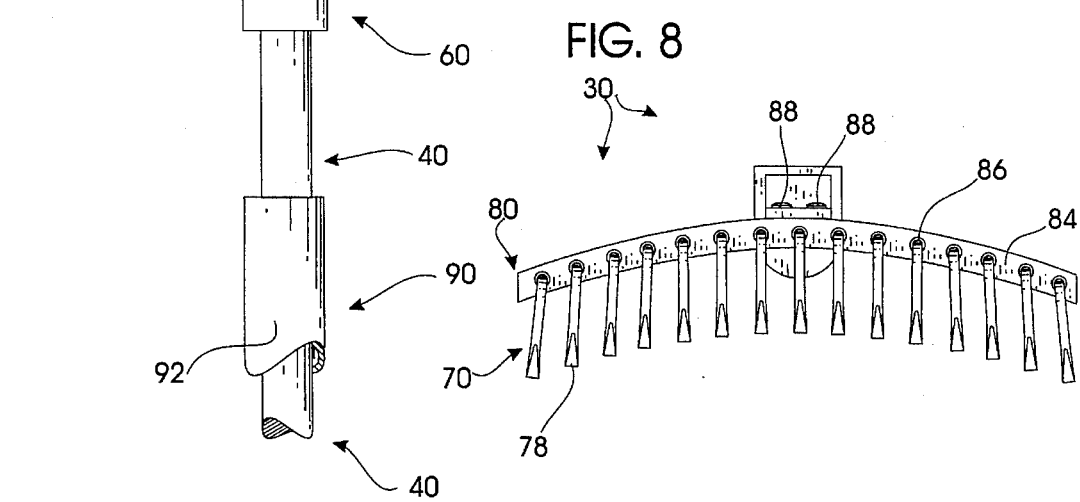

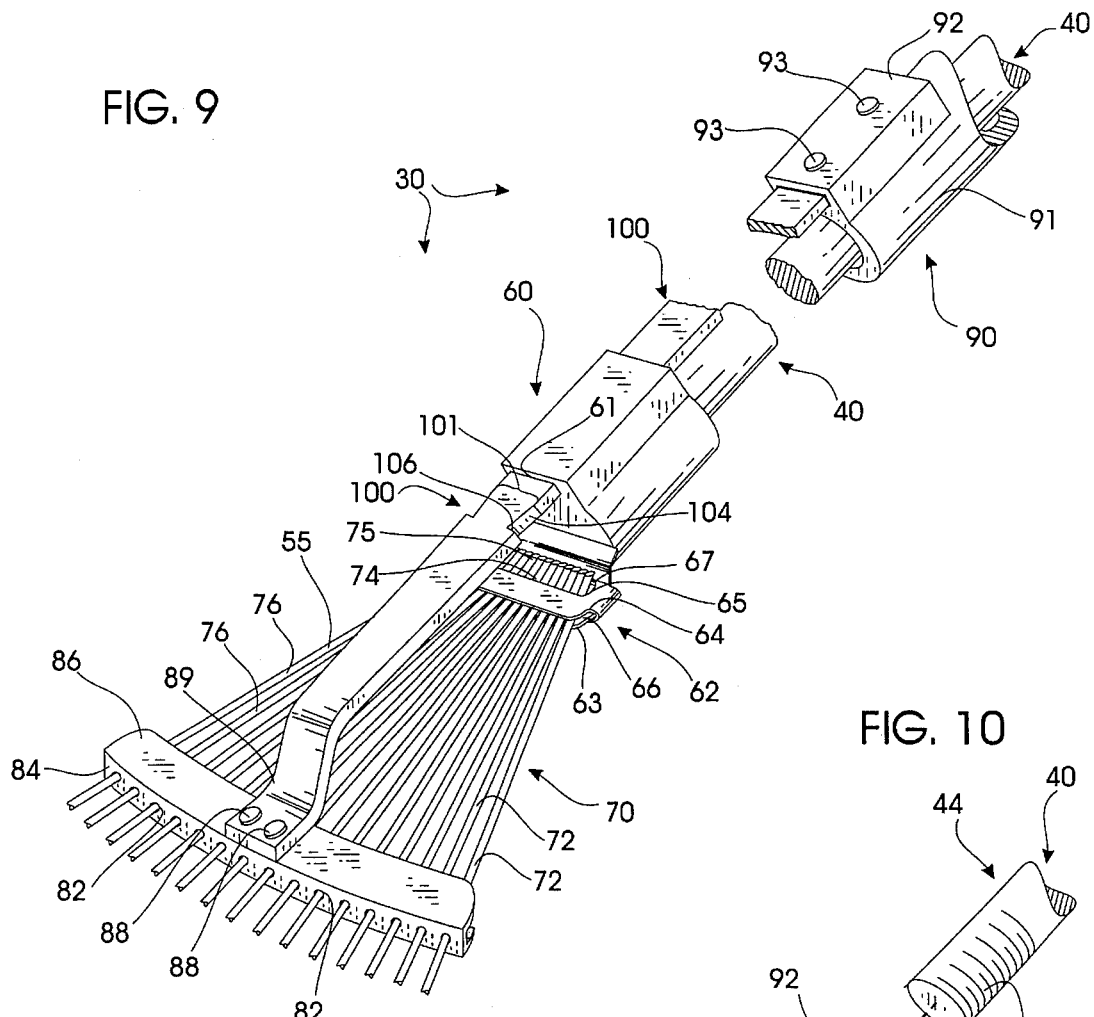
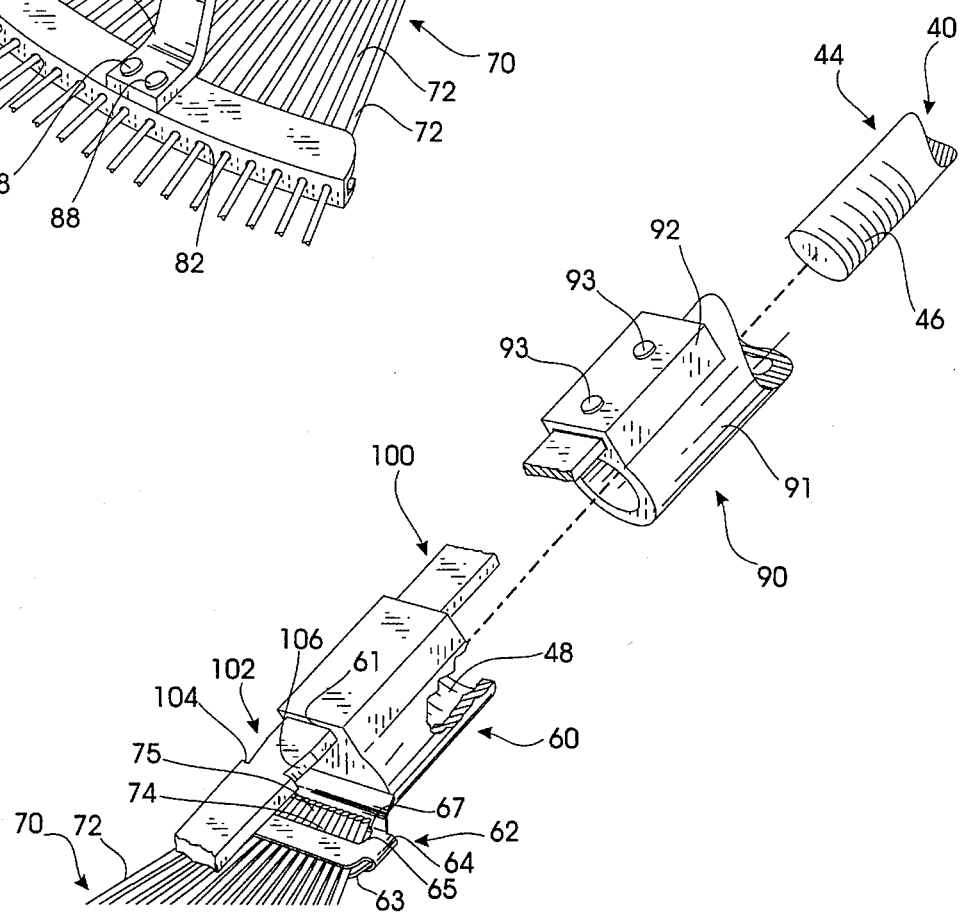

SELF-CLEANING RAKE

BACKGROUND OF THE INVENTION

I. Field of the Invention

The present invention relates generally to rakes. More particularly, the present invention relates to a rake assembly that utilizes a sliding spreader to clean the tines of the rake. Known relevant prior art rakes are classified in United States Patent Class 56, subclasses 400.1 and 400.8.

II. Description of the Prior Art

As will be recognized by those skilled in the art, lawn care often involves the use of a rake to collect leaves and other materials. This debris often clogs the tines of conventional rakes. To clean the debris from the rake tines, the user most cease raking and manually remove the debris from the tines. This is a time consuming procedure and it can be troublesome for elderly individuals with physical limitations.

Another problem with conventional yard rakes is the typical fixed width of the rake header and the span of the tines. Often it is desirable to adjust the span of the tines to effectively manipulate the rake around obstacles without undue operator exertion.

However, adjustable rakes need to retain the sturdiness and stability of conventional rakes. Another desirable characteristic of modern rakes is their use of a separable rake handle.

As is well known in the art, rake handles often break with extended use or because of misuse. Modern rakes often employ a separable handle coupled to a conventional rake assembly. Conventional designs often employ a screw on handle with a receiver in the header of the assembly.

Several prior art devices have addressed some of the problems with conventional yard rakes. The known prior art directed to the adjustability of the header widths and tine span generally requires the operator to manipulate the header width while the rake is not in use. U.S. Pat. No. 3,701,243 discloses an adjustable rake that uses a split collar and locking nut arrangement to maintain the tines in a selected orientation relative to the handle of the rake. U.S. Pat. No. 4,086,750 discloses an adjustable rake that uses a removable pin to maintain a selected tine span. In both of these patents, the operator must cease raking to adjust the header position.

The known prior art directed to cleaning rake tines generally uses headers having fixed lengths. U.S. Pat. Nos. 3,901,010 and 4,165,598 both disclose self-cleaning rakes with fixed width headers that have automatically activated cleaning members. U.S. Pat. Nos. 4,776,158, 4,059,945 and 4,850,185 all show hand actuated cleaners for rakes with fixed width headers.

The most pertinent, known related prior art device is disclosed in U.S. Pat. No. 3,884,023. This device combines tine span adjustability with tine cleaning. This patent discloses a sliding cleaner that compresses and cleans the tines simultaneously.

However, the tines of this device do not pivot about a common axis. Instead, the cleaner bends the tines to narrow the tine span when cleaning or compressing the tine span. As a result of this procedure, the cleaner becomes progressively more difficult to operate because of the progressive tine stiffness as the cleaning member is extended.

The known prior art fails to provide an easily manipulatable spreader that yieldably locks into a stored position when not in use. The prior art also fails to provide a spreader that becomes progressively easier to extend and that uses the inherent resistance of a return stroke to temporarily lock the spreader into a storage configuration.

Another advantage lacking in the prior art is a rake assembly that easily couples to conventional yard and household implement handles. Yet another advantageous attribute lacking in the prior art is a rake span that is quickly and efficiently adjustable to accommodate diverse operating parameters.

Therefore it is desirous to provide a self cleaning rake that can be easily fitted to conventional existing or replacement handles. It is also desirable to provide a rake that conveniently secures the spreader in a temporary locked relationship. Further, it is also desirable to provide a rake that quickly adjusts the tine span to permit the operator to avoid immobile obstacles.

SUMMARY OF THE INVENTION

I have designed a self-cleaning rake that couples a rake assembly to a conventional broom, mop, or other conventional yard implement handle. The rake handle attaches to a receiver in the header of the rake assembly.

In one preferred embodiment, my self-cleaning rake uses an exterior hand operated actuator that is coupled to a spreader by a link. The operator moves the actuator longitudinally along the rake handle.

In an alternative embodiment, my self-cleaning rake uses an interior actuator that is housed inside the rake handle. The rake handle also houses a substantial portion of the link. A hand grip protrudes from the side of the rake handle to facilitate operator manipulation of the actuator. An arm attaches the link to the hand grip.

In both embodiments, the longitudinal movement of the actuator forces the spreader to slide longitudinally along the rake tines to remove debris from the tines. The tines pivot about a flanged housing in the header to move radially as the spreader moves longitudinally.

A guide in the header supports the link while restricting its longitudinal range of movement. The guide also temporarily frictionally locks the spreader into a stored or retracted position that permits the rake to be conventionally used. The inherent resistance of the material being raked assists the operator when locking the spreader into the storage position. The tine span is thus adjustable by the operator to adapt to the particular situation in which the rake is being used.

Thus, a primary object of the present invention is to provide a self-cleaning rake that uses replaceable handles.

Another primary object is to provide a self-cleaning rake that temporarily locks the spreader in a stored position to facilitate conventional rake use.

A related object of the present invention is to provide a frictional lock that yieldably secures a cleaning member.

Another basic object of the present invention is to provide a self-cleaning rake that is economical to manufacture and simple to use.

A related object of the present invention is to provide a rake assembly that may be uncoupled from a conventional implement handle.

Another basic object of the present invention is to provide an efficient cleaning movement for a self-cleaning rake.

A related object of the present invention is to provide a rake that assists the operator in moving the cleaning member to a locked, storage position.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 2 is a partially fragmented top plan view of the invention, showing the spreader in a stored position, with dashed line depicting a moved position and with pieces broken away and portions omitted for clarity;

FIG. 3 is a top plan view similar to FIG. 2, but showing the spreader in a cleaning position;

FIG. 4 is a side elevational view thereof;

FIG. 5 is a top plan view similar to FIG. 3, showing an alternative embodiment of the invention;

FIG. 6 is a side elevational view similar to FIG. 4 showing an alternative embodiment of the invention;

FIG. 7 is a bottom plan view of the invention, taken from the opposite side of FIG. 3;

FIG. 8 is an end plan view thereof;

FIG. 8A is a cross-sectional view taken generally along line 8A—8A of FIG. 4, showing the lock system;

FIG. 9 is a greatly enlarged partially fragmented perspective view of the invention;

FIG. 10 is a greatly enlarged, partially fragmented perspective view of the invention similar to FIG. 9, with pieces broken way and portions omitted for clarity.

DETAILED DESCRIPTION

Figure 1:
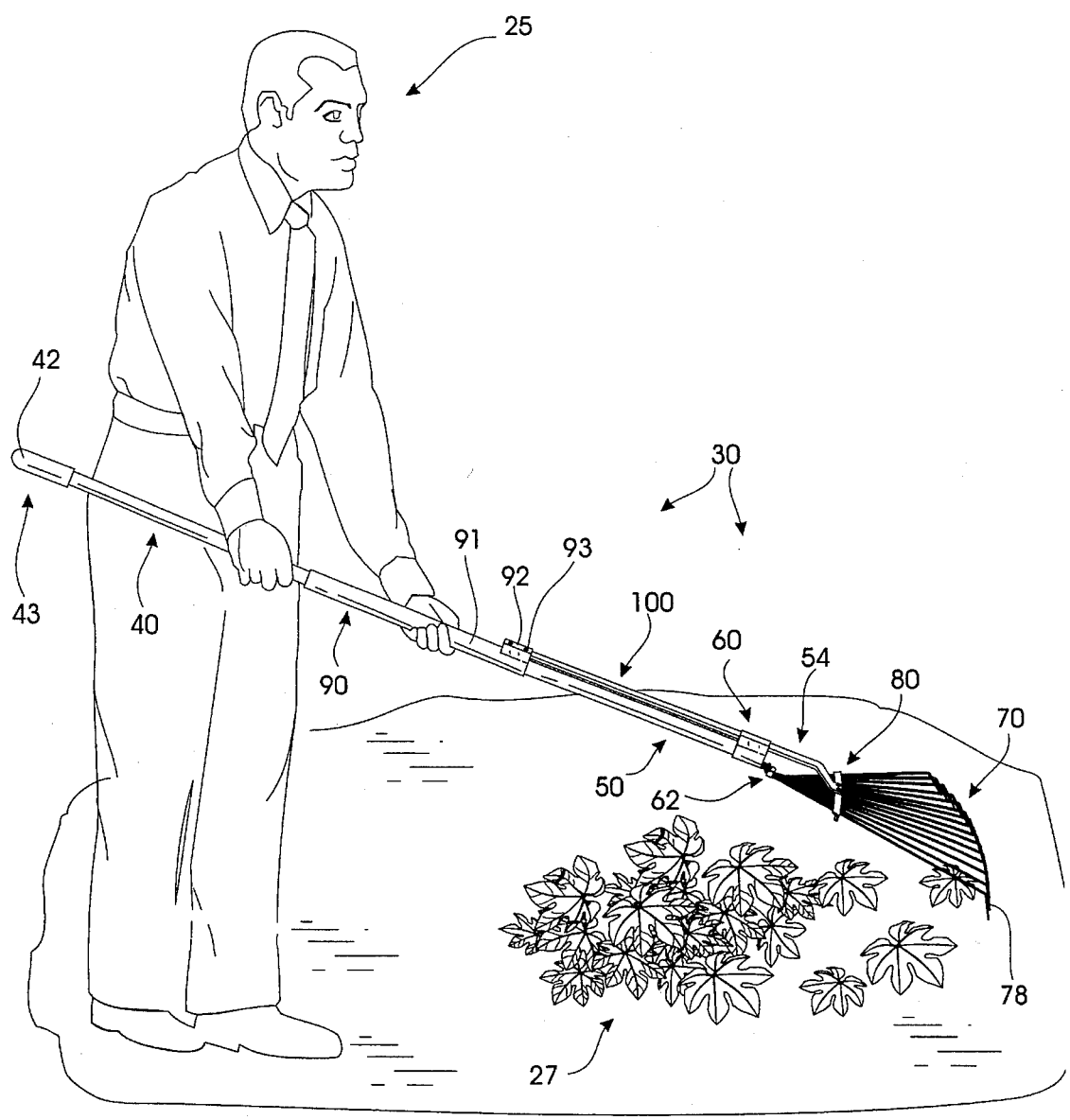
FIG. 1 is an environmental view of the invention, showing the self-cleaning rake used like a conventional rake.

Referring more specifically to the drawings, an operator 25 uses my self-cleaning rake 30 to rake leaves 27 or other materials (FIG. 1). The rake 30 may be used as a conventional yard rake or the tines may be adjusted to permit the rake to be used in restricted areas.

The self-cleaning rake 30 comprises a conventional rake handle 40 coupled to a rake assembly 50. The rake handle 40 is generally formed of wood while the rake assembly 50 may be formed from common plastic materials or made of more durable materials, such as hardened steel or aluminum.

In the preferred embodiment, the rake assembly 50 mounts the rake handle 40 via a conventional rod and receiver coupling (FIG. 10). Thus, the rake handle 40 can be easily removed from the rake assembly 50 to facilitate it use in several implements. The rod and receiver coupling can be anyone of a number of conventional rod-receiver coupling relationships commonly used in the handle industry ranging from a simple screw and screw hole receiver to a more complicated arrangement. In the alternative embodiment, the rake handle 40 is hollow and is permanently coupled to the rake assembly 50.

A hand grip 42 mounts a terminal end 43 of handle 40. The opposite end 44 of handle 40 preferably has raised threads 46. The threads 46 are screwed into a threaded receiver 48 formed in the rake assembly 50 (FIGS. 1 and 10). Of course, a metal stud or another conventional coupling arrangement could be used to removably couple the handle to the rake assembly.

The rake assembly 50 moves between a retracted, stored position 54 and an extended, cleaning position 56 (FIG. 2). Rake assembly 50 comprises a header 60 mounting several pivotally independent tines 70. A spreader 80 slides along tines 70 to clean and adjust the angular distance between the individual tines 72. Preferably, the tines axis are oriented at an angular distance of about seven degrees when the spreader is in the storage position 54. The angular distance decreases to approximately three degrees when the spreader is extended to the deployed position 56.

The operator manipulates the spreader 80 by longitudinally sliding a hand actuator 90 that is coupled to the spreader 80 by a link 100. The link 100 penetrates a slot or guide 61 in header 60. A flange 62 depending from the header 60 captivates and pivotally houses the tines 70.

The flange 62 comprises a pair of flat, opposing plates 63, 64 that define an internal casing 65 having an opening 66. The upturned tine ends 74 penetrate the opening 66 and extend through a slot 67 defined in upper plate 64. The individual exterior ends 75 retain the tines 72 in the flange 62.

The tines 72 comprise flexible shafts 76 that extend from the captivated exterior ends 75 to opposing, down-turned raking ends 78 that contact the ground. The tine shafts 76 penetrate a series of equidistantly spaced-apart orifices 82 defined in spreader plate 84. The spreader plate perpendicularly connects to a top spreader plate 86. The spreader plate 86 is attached to the link 100 by a pair of screws or rivets 88.

In the preferred embodiment (FIGS. 1–4 and 7–10), an exteriorly mounted hand actuator 90 controls the manipulation of the spreader 80. The actuator 90 comprises a sliding hand grip 91 and a link coupler 92. The link coupler 92 attaches the link 100 to the hand grip 91 by screws or rivets 93. The link 100 moves longitudinally along the axis of the rake handle 40 between the stored position 54 and the cleaning or deployed position 56.

The link 100 is maintained in a spaced relationship with the rake handle 50 by the header 60. The link 100 penetrates guide 61 in the header.

In an alternative embodiment (FIGS. 5 and 6) the hand operated actuator 95 is primarily interiorly mounted within the rake handle 40. A hand grip 96 permits the operator to manipulate the spreader 80. A follower slot 46 along one side of the handle 40 permits the longitudinal movement of the actuator 95. The hand grip 96 is coupled to the link 100 by an arm 98 extending therefrom. The link 100 is substantially housed within the interior of handle 40. The guide 61 is formed within header 60 and still functions as in the preferred embodiment.

A locking detent system formed by link 100 and guide 61 temporarily, yieldably locks the spreader in the stored configuration 54 (FIG. 8A). The width 101 of link 100 gradually increases adjacent a pair of notches 102. The notches 102 are oppositely disposed notches 102 and defined in the sides of link 100 near the connection end 89.increased slightly. The notches 102 comprise a gradual, inwardly sloping decline 104 abutted by a vertical, outwardly extending locking wall 106.

A pair of cooperating, spaced-apart detents 69 formed in the side walls of the header 60 frictionally lock the notches 102 when they are drawn into the guide 61. This lock retains the spreader 80 in close proximity with the header 60 in storage position 54. A slight outward force must be exerted by the operator to extend the spreader 80 into an intermediate position 55. Once the frictional lock between the detents 69 and the notches 102 is overcome, the tines readily pivot and the spreader easily moves to the fully deployed position 56.

In operation the spreader 90 moves from a locked, storage position 54 through an intermediate position 55 to a deployed cleaning position 56 (FIGS. 2 and 9). The locked position facilitates the rakes conventional use (FIG. 1). The movement of the spreader 90 to the cleaning position causes tines 72 to move radially inwardly (FIG. 3). The tines 72 pivot about their terminal, captivated ends 75 to reduce the overall tine span.

Once the operator exerts enough extensive force to overcome the frictional locking engagement between the detents 69 and the notches 102, the spreader effortlessly extends to the deployed position 56.

The return movement of the spreader into the stored position 54 is assisted by the inherent resistance of the material being raked. As the operator pulls the rake rearwardly, the tine ends 78 pull leaves 27 toward the operator. The leaves resist and the pull of the operator upon the sliding actuator 90 facilitates the entry of the detents 69 into the notches 102.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A self-cleaning rake comprising:
   an elongated, rigid handle;
   a header coupled to said handle;
   a plurality of elongated, flexible rake tines, each of said tines comprising a stem pivotally coupled to said header;
   means for cleaning the rake comprising:
      an arcuate spreader slidably penetrated by each of said tines for deploying or contracting said tines by radially deflecting them;
      an elongated actuator for displacing the spreader, said actuator telescopingly coupled to said handle;
   locking means for selectively yieldably locking said handle and said actuator together when said tines are radially deployed wherein said locking means comprises guide means associated with said handle for controlling displacements of said actuator and said actuator comprises detent means yieldably engaged by said guide means; and,
   whereby said rake is cleaned as materials are removed from said tines by contact with said spreader.

2. The rake as defined in claim 1 wherein said header comprises a receiver threadably mated to the handle, and the handle comprises an elongated, replaceable cylindrical rod at least temporarily mated to said receiver.

3. The rake as defined in claim 1 wherein:
   said handle comprises an elongated, rigid rod having a hand grip at one end and an opposite end terminating in said header;
   said actuator comprises a sleeve coaxially captivated about said handle and reciprocally movable with respect thereto, said sleeve comprising an extension joining the sleeve to said spreader;
   said locking means comprises guide means associated with said handle for controlling displacements of said actuator;
   said extension penetrates said guide means; and,
   said extension and said guide means are detented together.

4. The rake as defined in claim 3 wherein said header comprises a receiver threadably mated to the handle, and the handle comprises an elongated, replaceable cylindrical rod at least temporarily mated to said spreader.

5. The rake as defined in claim 4 wherein each of said tines are radially deflected approximately twenty degrees.

6. A self-cleaning rake comprising:
   an elongated, rigid handle;
   a header coupled to said handle;
   a plurality of elongated, flexible rake tines, each of said tines comprising a stem pivotally coupled to said header;
   means for cleaning the rake comprising:
      an arcuate spreader slidably penetrated by each of said tines for deploying or contracting said tines by radially deflecting them;
      an elongated actuator for displacing the spreader, said actuator sleeved to said handle;
   locking means for selectively yieldably locking said handle and said actuator together when said tines are radially deployed; wherein said locking means comprises guide means associated with said handle for controlling displacements of said actuator and said actuator comprises detent means yieldably engaged by said guide means; and,
   whereby said rake is cleaned as materials are removed from said tines by contact with said spreader.

7. The rake as defined in claim 6 wherein:
   said handle comprises an elongated, rigid rod having a hand grip at one end and an opposite end terminating in said header; and,
   said actuator is reciprocally movable relative to the handle, and said actuator comprises an extension joined to the spreader.

8. The rake as defined in claim 7 wherein:
   said locking means comprises guide means associated with said handle for controlling displacements of said actuator; and,
   said extension penetrates said guide means; and,
   said extension and said guide means are detented together.

9. The rake as defined in claim 8 wherein said header comprises a receiver threadably mated to the handle, and the handle comprises an elongated, replaceable cylindrical rod at least temporarily mated to said spreader.

10. The rake as defined in claim 9 wherein each of said tines are radially deflected approximately twenty degrees.

11. A self-cleaning rake comprising:
    an elongated, rigid handle;
    a header coupled to said handle;
    a plurality of elongated, flexible rake tines, each of said tines comprising a stem pivotally coupled to said header;
    means for cleaning the rake comprising:
       an arcuate spreader slidably penetrated by each of said tines for deploying or contracting said tines by radially deflecting them;

an elongated actuator coaxially and slidably housed within said handle for displacing the spreader, said actuator telescopingly coupled to said handle;

locking means for selectively yieldably locking said handle and said actuator together when said tines are radially deployed;

wherein said locking means comprises guide means associated with said handle for controlling displacements of said actuator and said actuator comprises detent means yieldably engaged by said guide means; and, whereby said rake is cleaned as materials are removed from said tines by contact with said spreader.

12. The rake as defined in claim 11 wherein:

said handle comprises an elongated, rigid rod having a hand grip at one end and an opposite end terminating in said header; and, said actuator comprises a shaft coaxially disposed within said handle and reciprocally movable relative thereto, said shaft comprising an external extension joining the actuator to said spreader.

13. The rake as defined in claim 12 wherein:

said handle comprises an elongated follower slot;

said actuator shaft has an arm projecting through said slot for gripping by an operator to activate the spreader.

14. The rake as defined in claim 13 wherein:

said locking means comprises guide means associated with said handle for controlling displacements of said actuator; and, said extension penetrates said guide means; and, said extension and said guide are detented together.

* * * * *